Feb. 10, 1959 B. COOK 2,873,400

ION SWITCH

Filed Nov. 4, 1955 2 Sheets-Sheet 1

INVENTOR.
BUFORD COOK
BY
Roland A. Anderson
ATTORNEY.

Feb. 10, 1959

B. COOK 2,873,400

ION SWITCH

Filed Nov. 4, 1955

2 Sheets-Sheet 2

INVENTOR.
BUFORD COOK

BY

Roland A. Anderson

ATTORNEY.

United States Patent Office
2,873,400
Patented Feb. 10, 1959

2,873,400

ION SWITCH

Buford Cook, Livermore, Calif., assignor to the United States of America as represented by the United States Atomic Energy Commission Application November 4, 1955, Serial No. 545,137

11 Claims. (Cl. 313—231)

Figure 1:
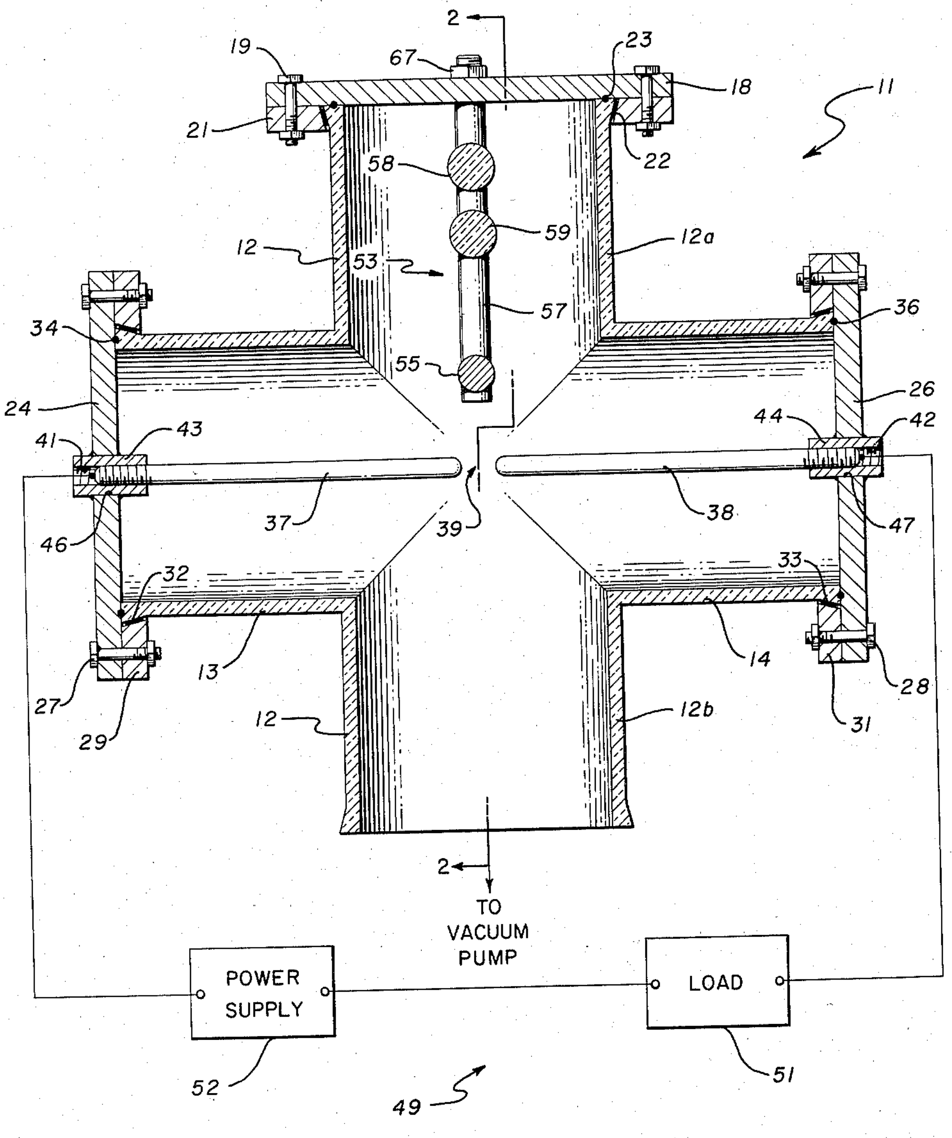

The present invention relates to electronic switches, and more specifically to an ion switch capable of transferring large magnitudes of power.

Conventional electronic switches of the type herein disclosed generally utilize a gaseous atmosphere in which arc electrodes are employed to ionize such gaseous material for providing an ionized gaseous conduction path between control electrodes and thereby close such electronic switch. Production of a gaseous conduction path in the aforementioned manner limits the repetition rate of switching by ionization and deionization time. In addition, the utilization of a gaseous atmosphere limits the power rating of such electronic switches by the gap spacing which it is feasible to employ without encountering extremely large structures. Therefore, the magnitude of gap spacing required in a gaseous atmosphere for holding extremely large currents renders such a device unpracticable for such use.

Many of the restrictions encountered in conventional electronic switches are overcome by the novel ion switch of the invention, wherein a gas free atmosphere, i. e., highly evacuated region, is utilized and in which an ionic conduction path is generated directly by a source unit of the type which supersedes the function of the conventional arc electrodes and gaseous atmosphere. It will be found that the direct generation of an ionic conduction path eliminates the ionization and deionization time encountered in conventional electronic switches, and, therefore, the device of the invention is operable at very high repetition rates. In addition, the utilization of an evacuated region in the present invention, rather than the conventional gaseous atmosphere, permits the utilization of very small gap spacing between control electrodes and thereby provides such device with compactness and practicability for switching extremely high power loads.

It is therefore an object of the present invention to provide a new and improved electronic switch capable of passing extremely high currents.

It is another object of the present invention to provide an ion switch free of mechanical movements.

An important object of the present invention is to provide an ion switch which utilizes a unique source unit to controllably provide an ionic conduction path between control electrodes for closing the switch and thereby render such switch capable of exceedingly rapid actuation.

An additional object of the present invention is to provide an ion switch of large power rating and capable of operating at a high repetition rate for long durations of operation.

A further object of the present invention is to provide an ion switch having a precisely controllable time of firing.

Still another object of the present invention is to provide an ion switch characterized by compactness and economy of construction (even at high power ratings) and, in addition, minimum erosion of control electrodes.

A still further object of the invention is to provide an ion switch capable of transferring high magnitudes of pulsed power.

Figure 2:
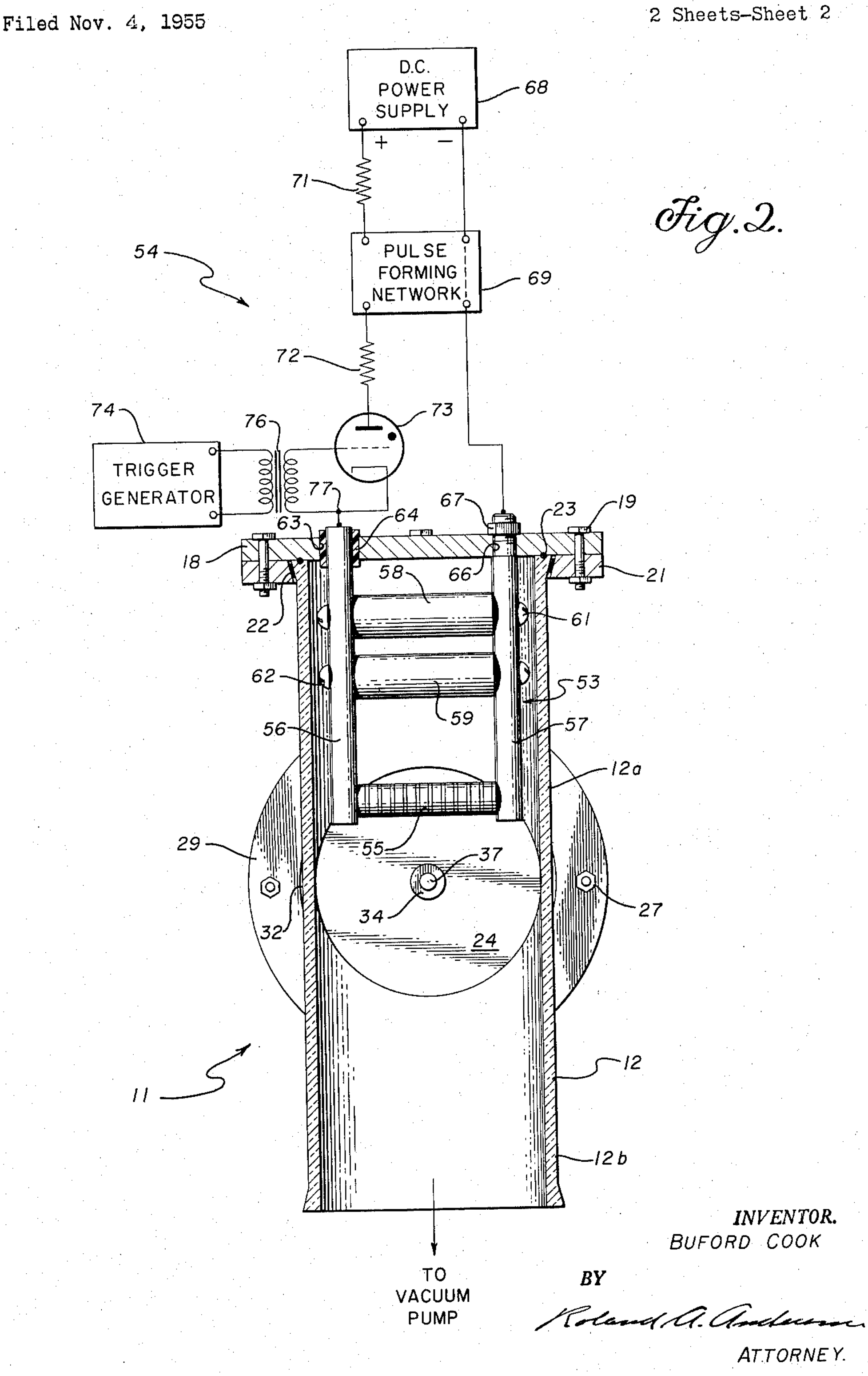

The invention, both as to its organization and method of operation, together with further objects and advantages thereof, will best be understood by reference to the following specification taken in conjunction with the accompanying drawings, of which Figure 1 is a longitudinal cross sectional view of a preferred embodiment of the invention shown as connected in a conventional schematically represented load circuit; and Figure 2 is a sectional view taken along line 2—2 of Fig. 1 and showing diagrammatically the electrical circuit for energizing the source unit.

Briefly, such an ion switch, constructed in accordance with the invention, includes in combination and arranged in a highly evacuated region, a pair of spaced control electrodes for connection in a conventional circuit to control the passing of power therethrough. A controllable ionic conduction path is directly provided between such control electrodes by a source unit to close the ion switch. Conventional power supply means are provided to trigger the source unit and control the magnitude, duration and pulse repetition rate of the aforementioned ionic conduction path.

More particularly, referring to the accompanying drawings, the highly evacuated region of previous mention preferably is provided by an evacuated envelope indicated generally at 11 and constructed of dielectric material such as glass. Although a variety of configurations may be employed, envelope 11 is shown in the preferred embodiment as cross-shaped to illustrate a convenient housing in which the elements of the ion switch can be advantageously arranged and supported in the minimum of space to provide a compact and easily evacuated envelope.

Envelope 11 may be fabricated of a cylindrical tube 12 interposed perpendicularly between two similar cylindrical tubes 13 and 14, respectively, such as to provide communication between the composite encompassed regions. Tubes 13 and 14 are hermetically secured to tube 12 by any suitable means such as by fusing, and resemble in appearance a common pipe fitting, i. e., cross. The outward extremity of upper tube **12*a* and lower tube 12*b*, as well as tubes 13 and 14**, are flared to facilitate the attachment of closure plates, as noted below.

The upper projecting termination of envelope 11 is closed by an annular metal end plate 18 secured by bolts 19 extending through a tapered metal flange 21 arranged to fit around the tapered extremity of tube **12*a* and encompasses an annular pressure gasket 22 therebetween. A gasket or O-ring 23 is disposed between the end of tube 12*a* and plate 18 to provide a vacuum tight seal by tightening bolts 19 until plate 18 is clamped substantially flat against tube 12**.

As shown in Fig. 1, both of the outer terminations of tubes 13 and 14 are similarly closed by annular metal end plates 24 and 26 secured to the corresponding tapered terminations of tubes 13 and 14 by bolts 27 and 28 extending through tapered flanges 29 and 31, respectively. Flange 29 is disposed around the termination of tube 13 and encompasses a pressure gasket 32 interposed therebetween; and flange 31 is disposed around the termination of tube 14 and encompasses a pressure gasket 33 interposed therebetween. Airtight seals are provided between plates 24 and 26 and the corresponding adjacent tubes 13 and 14 by O-rings 34 and 36 disposed therebetween; by proper tightening of bolts 27 and 28 plates 24 and 26 will be clamped against envelope 11 in vacuum tight relationship.

Means for establishing a highly evacuated region in envelope 11 is provided by connecting the lower termination of tube 12b to conventional vacuum pumping apparatus (not shown).

Control electrodes formed of two slender and identical cylindrical members 37 and 38, as shown in Fig. 1, are connected to a power load as later described, both of such members being constructed of electrical conducting material, such as copper. Control electrodes 37 and 38 are secured to opposing side terminations of envelope 11 and are arranged to extend inwardly in collinear alignment and terminate short of the center of envelope 11 to form a gap 39 therebetween. All surfaces of control electrodes 37 and 38 are necessarily smooth to minimize erosion, the latter effect being minimized also by the absence of a surrounding gaseous atmosphere. The length of gap 39 will depend on the magnitude of the power to be passed and the degree of evacuation of, i. e., pressure in envelope 11, as determined by Paschen's Law which is known in the art, the outward terminations of electrodes 37 and 38 are threaded for disposal in threaded bores 41 and 42 extending through bushings 43 and 44, respectively. Conventional means such as gaskets or the like are employed to provide vacuum tight seals between electrodes 37 and 38 and the corresponding bushings 43 and 44. Bushing 43 is disposed in an aperture 46 centrally located in plate 24; and bushing 44 is disposed in an aperture 47 centrally located in plate 26. Both bushings are soldered to the corresponding plates to assure vacuum tight relationships therebetween.

Electrodes 37 and 38 are connected in a conventional load circuit 49 through which it is desired to conduct power of large magnitude. As shown in Fig. 1, load circuit 49 includes a load 51 connected to electrode 38 and a power supply 52 connected between load 51 and electrode 37. Electrode 38 will remain at the potential of load 51 until a conduction path, e. g., ion cloud, is provided across gap 39.

It will be noted here that the required length of gap 39 to maintain the foregoing condition is relatively small, i. e., small in comparison to the length required in a gaseous region under similar power loads.

The aforementioned ion cloud or path is controllably supplied to gap 39 by a unique source unit 53 which is coupled to an electrical circuit 54 for energization as shown in Fig. 2. However, a variety of source units, e. g., ion sources, plasma sources, and the like, may be utilized for this purpose and especially those that are readily controllable and rapidly actuating. Source unit 53 utilized in the preferred embodiment of the ion switch of the invention and shown in the drawings, is the subject of U. S. Patent No. 2,786,143 issued March 19, 1957 and has been very successfully utilized in providing the aforesaid conduction path.

Briefly, source unit 53 includes a plasma emitter 55 of interleaved occluded-gas metallic and dielectric discs secured between the lower terminations of clamping electrodes 56 and 57 which are immobilized by two spaced cylindrical ceramic standoffs 58 and 59 superposed in spaced parallel relationship with plasma emitter 55 and secured between clamping electrodes 56 and 57 by screws 61 and 62, respectively. Plasma emitter 55 preferably is constructed of titanium metallic discs occluded with large quantities of deuterium and dielectric discs formed of mica.

Source unit 53 is secured to plate 18 and extends into the evacuated region enclosed by envelope 11 terminating at the plasma emitter extremity a short distance above gap 39. Source 53 is arranged in tube 12 such that the longitudinal axis of plasma emitter 55 is perpendicular to the longitudinal axis of control electrodes 37 and 38 and, further, such that the planes of the aforesaid axes are spaced apart and parallel with each other. The upper termination of clamping electrode 56 passes through an aperture 63 in plate 18 and is hermetically insulated therefrom by a short, cylindrical metal-to-glass seal 64, as is known in the art. Electrode 57 extends through an aperture 66 in plate 18 to which it is secured by a nut 67. The portion of electrode 57 proximal the lower surface of plate 18 may be hermetically sealed thereto by any suitable means such as soldering.

The hereinbefore mentioned electrical pulsing means to energize source unit 53 comprising circuit 54 is coupled to clamping electrodes 56 and 57 to provide a pulse line voltage across plasma emitter 55 for causing the release of deuterons therefrom and thereby establishing the aforementioned ion cloud in gap 39. In more detail, circuit 54 includes a D. C. power supply; 68 having its negative terminal connected through a conventionally designed pulse forming network 69 to electrode 57, which is allowed to float electrically. The positive terminal of power supply 68 is connected through a charging resistor 71 to pulse forming network 69 and thence through a terminating resistor 72 to the anode of a thyratron 73. The cathode of thyratron 73 is connected to electrode 56. A trigger generator 74 is provided to actuate thyratron 73 through an isolating pulse transformer 76; one terminal of the secondary of transformer 76 is connected to the grid of thyratron 73 and the other terminal is connected to a juncture 77 located between the cathode of thyratron 73 and electrode 56. Trigger generator 74 is of any conventional design and may be set at the pulse repetition rate at which it is desired to run source unit 53 and therefore the ion switch of the invention.

In starting operation of the ion switch, envelope 11 is necessarily evacuated and control electrodes 37 and 38 are connected in the load circuit, e. g., circuit 49, through which it is desired to switch power, and then trigger generator 74 is properly set and turned on. During operation, thyratron 73 is actuated by a positive pulse generated by trigger generator 74, transmitted through isolating pulse transformer 76 and applied to the grid of thyratron 73 causing tube conduction. The instant that thyratron 73 is actuated, pulse forming network 69 previously charged by D. C. power supply 68 will deliver a pulse line voltage across electrodes 56 and 57 and therefore across plasma emitter 55 causing arcing between the peripheral surfaces of the metallic discs of emitter 55. During the aforesaid arcing, sufficient heat is imparted to emitter 55 to release ions (deuterons), and thereby a deuteron ion cloud is provided in gap 39 causing electrodes 37 and 38 to discharge. Such ion cloud serves as an excellent electrical conductor and thus closes the ion switch and passes the power load from circuit 49.

It should be mentioned that gas emission and simultaneous ionization is confined exclusively to the duration of the electrical arcing, as determined by the electrical characteristics of circuit 54, and will cease upon discontinuance of the aforesaid pulse line voltage at which time the ion switch is automatically opened as the ion cloud is neutralized or pulled out by the vacuum pumping. Therefore, the magnitude, pulse repetition rate, and duration of the ion cloud provided in gap 39, can be readily controlled by proper selection and adjustment of the electrical components of circuit 54 to obtain the desired switching of the power load from circuit 49 by the ion switch of the invention whereby the above process is repeated each time trigger generator 74 delivers a pulse to thyratron 73.

While the invention has been described with reference to a preferred embodiment, it will be apparent to those skilled in the art that numerous variations and modifications may be made within the spirit and scope of the invention and thus it is not intended to limit the invention except as defined in the following claims.

What is claimed is:

1. An ion switch comprising an evacuated envelope, a pair of opposing control electrodes disposed in said envelope and spaced apart from each other to form a gap, and a controllable gas-free source of ions for providing a time controlled ionic conduction path across said gap.

2. An ion switch comprising in combination and arranged in an evacuated region, a pair of control electrodes oppositely disposed in said region and spaced apart to form a gap, a gas-free source unit in said region and spaced from said electrodes for providing ions to said gap, electrical means energizing said source unit, and means for connecting said electrodes in an electrical circuit whereby a switching action may be obtained.

3. An ion switch comprising an evacuated gas-tight envelope, a pair of oppositely disposed control electrodes disposed in said envelope and spaced apart to form a gap, means maintaining said gap gas-free, a source unit controllably providing ions to said gap for closing said switch, electrical means for energizing said source unit, and means for connecting said electrodes in an electrical circuit whereby a switching action may be obtained.

4. An ion switch comprising an airtight envelope, vacuum pumping means for evacuating said envelope, a pair of control electrodes oppositely disposed in said envelope and spaced apart to form a gap in high vacuum, a source unit spaced from said gap for controllably providing an ionic conduction path between said electrodes, pulsed electrical means for energizing said source unit, and means for connecting said electrodes in an electrical circuit whereby a switching action may be obtained.

5. An ion switch as described in claim 4 wherein said source unit comprises in combination a plasma emitter constructed of a plurality of interleaved metallic and dielectric discs having a selected gaseous material occluded in the peripheral surfaces of said metallic discs, and spaced clamping electrodes secured to the terminations of said plasma emitter for supporting the same.

6. An ion switch comprising a cross-shaped envelope, a vacuum pump coupled to said envelope for evacuating the same, a pair of control cylindrical electrodes disposed in said envelope in collinear relationship and spaced apart to provide a gap therebetween, said electrodes being adapted for connection in circuit with a power supply and load, an occluded gas ion source unit secured in said envelope and spaced from said gap, pulsed electrical means for controllably energizing said source unit causing generation of an ion cloud, and thereby providing an ionic conduction path in said gap for closing said switch and energizing said load.

7. An ion switch comprising an envelope, a vacuum pump coupled to said envelope for establishing a highly evacuated region therein, a pair of slender cylindrical control electrodes secured in said envelope and arranged in said region in collinear spaced relationship providing a gap therebetween, a pair of parallel spaced clamping electrodes secured in said envelope and arranged perpendicular with said control electrodes directly opposite and spaced from said gap, a plasma emitter constructed of interleaved occluded-gas metallic and dielectric discs, said plasma emitter perpendicularly secured between said clamping electrodes adjacent said gap, and electrical means coupled to said clamping electrodes for establishing an electrical discharge between peripheral surfaces of said metallic discs.

8. An ion switch as described in claim 7 wherein said electrical means comprises an electrical pulse generator.

9. An ion switch as described in claim 7 wherein said occluded-gas metallic discs comprise hydrogenated metallic discs.

10. An ion switch comprising a cross-shaped envelope, a vacuum pump connected to said envelope for establishing a highly evacuated region therein, a pair of slender cylindrical control electrodes secured in said envelope and arranged in said region in collinear spaced relationship providing a gap therebetween, a pair of parallel spaced clamping electrodes secured in said envelope and arranged perpendicular with said control electrodes directly opposite and spaced from said gap, a plasma emitter constructed of interleaved hydrogenated metallic and dielectric discs, said plasma emitter being secured perpendicularly between said clamping electrodes adjacent said gap, and an electrical pulse generator connected between said clamping electrodes for establishing an electrical discharge across said plasma emitter and thereby generating a hydrogen isotopic ionic cloud to provide a conduction path across said gap.

11. An ion switch as described in claim 10 wherein said electrical pulse generator includes a thyratron triggered by a trigger generator for controlling the pulse repetition rate of said switch.

References Cited in the file of this patent

UNITED STATES PATENTS

| | | |
|---|---|---|
| 2,128,884 | Marx et al. | Aug. 30, 1938 |
| 2,228,846 | Prince | Jan. 14, 1941 |
| 2,764,707 | Crawford et al. | Sept. 25, 1956 |
| 2,774,008 | Rooks | Dec. 11, 1956 |